(12) United States Patent
Potkalesky et al.

(10) Patent No.: US 11,341,430 B2
(45) Date of Patent: *May 24, 2022

(54) CREATING A MACHINE LEARNING POLICY BASED ON EXPRESS INDICATORS

(71) Applicant: ZixCorp Systems, Inc., Dallas, TX (US)

(72) Inventors: Daniel Joseph Potkalesky, Garland, TX (US); Mark Stephen DeMichele, Ann Arbor, MI (US)

(73) Assignee: ZixCorp Systems, Inc., Dallas, TX (US)

( * ) Notice: Subject to any disclaimer, the term of this patent is extended or adjusted under 35 U.S.C. 154(b) by 752 days.

This patent is subject to a terminal disclaimer.

(21) Appl. No.: 16/194,532

(22) Filed: Nov. 19, 2018

(65) Prior Publication Data

US 2020/0160209 A1    May 21, 2020

(51) Int. Cl.
   *G06N 20/00*    (2019.01)
   *G06F 21/60*    (2013.01)

(52) U.S. Cl.
   CPC .......... *G06N 20/00* (2019.01); *G06F 21/602* (2013.01)

(58) Field of Classification Search
   CPC .... G06N 20/00; G06F 21/602; G06Q 10/107; H04L 51/02; H04L 63/0428; H04L 63/123; H04W 4/12
   USPC .......................................................... 706/12
   See application file for complete search history.

(56) References Cited

U.S. PATENT DOCUMENTS

| | | | |
|---|---|---|---|
| 9,514,414 B1 | 12/2016 | Rosswog | |
| 9,774,626 B1 * | 9/2017 | Himler | H04L 63/1433 |
| 10,063,584 B1 * | 8/2018 | Wescoe | G06F 21/562 |
| 2005/0138353 A1 * | 6/2005 | Spies | H04L 63/0442 |
| | | | 713/153 |
| 2006/0161423 A1 | 7/2006 | Scott | |
| 2009/0319456 A1 * | 12/2009 | Consul | H04L 51/12 |
| | | | 706/21 |
| 2011/0131279 A1 * | 6/2011 | Karnik | G06Q 10/107 |
| | | | 709/206 |
| 2011/0208960 A1 | 8/2011 | Flood | |
| 2012/0023182 A1 * | 1/2012 | Pulfer | G06Q 10/107 |
| | | | 709/206 |

(Continued)

FOREIGN PATENT DOCUMENTS

WO    WO 2011/112460 A2    9/2011
WO    WO 2011/112460 A3    9/2011

OTHER PUBLICATIONS

Gupta, "Email Classification into Relevant Category Using Neural Networks", 2016. (Year: 2016).*

(Continued)

*Primary Examiner* — Dave Misir
(74) *Attorney, Agent, or Firm* — Sprinkle IP Law Group

(57) ABSTRACT

According to some embodiments, a method performed by a classification scanner comprises receiving an electronic message and determining a classification that applies to the electronic message. The classification is determined based on an express indication from a user. The method further comprises providing a machine learning trainer with the electronic message and an identification of the classification that applies to the electronic message. The machine learning trainer is adapted to determine a machine learning policy that associates attributes of the electronic message with the classification.

19 Claims, 10 Drawing Sheets

(56) References Cited

U.S. PATENT DOCUMENTS

| | | | |
|---|---|---|---|
| 2012/0278862 A1* | 11/2012 | Touboul | H04L 51/12 726/4 |
| 2015/0026104 A1 | 1/2015 | Tambos | |
| 2016/0379139 A1* | 12/2016 | Eldar | G06F 16/285 706/12 |
| 2018/0121830 A1* | 5/2018 | Schmid | G06Q 50/01 |
| 2019/0102683 A1 | 4/2019 | Jayaraman | |
| 2020/0034752 A1 | 1/2020 | Luo | |
| 2020/0067861 A1* | 2/2020 | Leddy | H04L 51/12 |
| 2020/0162480 A1 | 5/2020 | Potkalesky | |
| 2020/0193380 A1 | 6/2020 | Sivaraman | |
| 2020/0344194 A1 | 10/2020 | Hosseinisianaki | |
| 2020/0364605 A1 | 11/2020 | Gorham | |

OTHER PUBLICATIONS

Extended European Search Report for corresponding European Application No. 19198163 dated Nov. 26, 2019.

Li Wenjuan et al: "Towards designing an email classification system using multi-view based semi-supervised learning", 2014 IEEE 13th International Conference on Trust, Security and Privacy in Computing and Communications, IEEE, Sep. 24, 2014 (Sep. 24, 2014), pp. 174-181, XP032724914, DOI: 10.1109/TRUSTCOM.2014.26 [retrieved on Jan. 15, 2015].

European Patent Office, Communication pursuant to Article 94(3) EPC, Application No. 19198163.8, dated Jul. 13, 2021, 6 pages.

Potkalesky et al. "Delivery of an Electronic Message Using a Machine Learning Policy," fifed Nov. 19, 2018, U.S. Appl. No. 16/194,609, 42 pages.

Office Action issued for U.S. Appl. No. 16/410,412, dated Feb. 17, 2022, 27 pages.

Office Action issued for U.S. Appl. No. 16/194,609, dated Mar. 30, 2022, 12 pages.

Extended European Search Report for European Patent Application No. 19198164.6, dated Apr. 1, 2020, 8 pgs.

Deepak Kumar Gupta, et al., "Email Classification into Relevant Category Using Neural Networks", Reckon Analytics, (arXiv:1802.03971v1, Feb. 12, 2018), Jul. 10, 2017, 9 pgs.

Office Action for U.S. Appl. No. 16/410,412, dated May 13, 2021, 24 pgs.

Office Action for U.S. Appl. No. 16/194,609, dated Sep. 16, 2021, 11 pgs.

Office Action for U.S. Appl. No. 16/410,412, dated Nov. 3, 2021, 27 pgs.

Office Action for European Patent Application No. 19198164.6, dated Dec. 13, 2021, 4 pgs.

* cited by examiner

CREATING A MACHINE LEARNING POLICY BASED ON EXPRESS INDICATORS

TECHNICAL FIELD

Certain embodiments of the present disclosure relate generally to creating a machine learning policy and more particularly to creating a machine learning policy based on express indicators.

BACKGROUND

In a computer network, a sender may transmit files, email messages, and other data to a recipient. When sending the data, the sender may request that the data be handled in a certain way. As an example, the sender may request that the data be encrypted. Various techniques exist for encrypting data. As one example, public key encryption is a technique that may be used to encrypt data. In public key encryption, two separate keys are associated with the recipient, a public key and a corresponding private key. The sender obtains the recipient's public key, encrypts the data using the public key, and transmits the encrypted data to the recipient. The recipient decrypts the encrypted data using its corresponding private key. This technique protects the data from unauthorized recipients that do not possess the private key.

SUMMARY

According to certain embodiments, a method is disclosed for use in a classification scanner. The method comprises receiving an electronic message and determining a classification that applies to the electronic message. The classification is determined based on an express indication from a user. The method further comprises providing a machine learning trainer with the electronic message and an identification of the classification that applies to the electronic message. The machine learning trainer is adapted to determine a machine learning policy that associates attributes of the electronic message with the classification.

According to certain embodiments, a classification scanner is disclosed. The classification scanner comprises one or more interfaces and processing circuitry. The processing circuitry is operable to receive an electronic message via the one or more interfaces and determine a classification that applies to the electronic message. The classification is determined based on an express indication from a user. The processing circuitry is further operable to provide the electronic message and an identification of the classification that applies to the electronic message to a machine learning trainer via the one or more interfaces. The machine learning trainer is adapted to determine a machine learning policy that associates attributes of the electronic message with the classification.

According to certain embodiments, one or more non-transitory computer-readable media are disclosed. The non-transitory computer-readable media comprise logic that, when executed by processing circuitry, cause the processing circuitry to receive an electronic message and determine a classification that applies to the electronic message. The classification is determined based on an express indication from a user. The logic causes the processing circuitry to provide a machine learning trainer with the electronic message and an identification of the classification that applies to the electronic message. The machine learning trainer is adapted to determine a machine learning policy that associates attributes of the electronic message with the classification.

Certain embodiments of the above-described method, classification scanner, and/or logic may each include additional features, such as any one or more of the following features:

In some embodiments, the express indication comprises a flag configured by the user.

In some embodiments, the express indication comprises a keyword that the classification scanner associates with enabling the classification.

In some embodiments, the express indication comprises administrator feedback.

In some embodiments, the machine learning policy is enabled based on determining that a threshold number of electronic messages having been provided to the machine learning trainer.

In some embodiments, the classification indicates whether at least one of the following applies to the electronic message: encryption, quarantine, archive, brand.

In some embodiments, the classification indicates that best mode of delivery encryption applies to the electronic message.

In some embodiments, the machine learning policy corresponds to one of a plurality of machine learning policies determined by the machine learning trainer, and an indication of which of the machine learning policies to train with the electronic message is provided to the machine learning trainer.

In certain embodiments, an indication is provided to the machine learning trainer to train the same machine learning policy based on electronic messages received from different users that have one or more characteristics in common.

According to certain embodiments, a method is disclosed for use in a classification scanner. The method comprises receiving an electronic message and determining whether the electronic message includes an express indication from the user indicating that a classification applies to the electronic message. In response to determining that the electronic message does not include the express indication that the classification applies to the electronic message, the method sends the electronic message to a machine learning scanner. The machine learning scanner is adapted to use a machine learning policy to determine whether the classification applies to the electronic message.

According to certain embodiments, a classification scanner is disclosed. The classification scanner comprises one or more interfaces and processing circuitry. The processing circuitry is operable to receive an electronic message via the one or more interfaces and determine whether the electronic message includes an express indication from the user indicating that a classification applies to the electronic message. In response to determining that the electronic message does not include the express indication that the classification applies to the electronic message, the processing circuitry is operable to send the electronic message to a machine learning scanner via the one or more interfaces. The machine learning scanner is adapted to use a machine learning policy to determine whether the classification applies to the electronic message.

According to certain embodiments, one or more non-transitory computer-readable media are disclosed. The non-transitory computer-readable media comprise logic that, when executed by processing circuitry, cause the processing circuitry to receive an electronic message and determine whether the electronic message includes an express indication from the user indicating that a classification applies to the electronic message. In response to determining that the electronic message does not include the express indication that the classification applies to the electronic message, the logic causes the processing circuitry to send the electronic message to a machine learning scanner. The machine learning scanner is adapted to use a machine learning policy to determine whether the classification applies to the electronic message.

Certain embodiments of the above-described method, classification scanner, and/or logic may each include additional features, such as any one or more of the following features:

In some embodiments, the machine learning scanner to which the electronic message is sent is further adapted to send the electronic message to an enforcer adapted to apply the classification if the classification applies to the electronic message and to bypass the enforcer if the classification does not apply to the electronic message.

In some embodiments, a second electronic message is received and a determination is made whether the second electronic message includes an express indication from the user indicating that a classification applies to the second electronic message. In response to determining that the second electronic message includes the express indication that the classification applies to the second electronic message, the second electronic message is sent to an enforcer adapted to apply the classification.

In some embodiments, the electronic message is sent to the machine learning scanner further in response to determining that at least a threshold number of electronic messages have been provided to a machine learning trainer adapted to determine the machine learning policy used by the machine learning scanner.

In some embodiments, the machine learning scanner is instructed to apply the machine learning policy to electronic messages associated with a second user in response to determining that one or more characteristics associated with the second user match one or more characteristics associated with the user.

In some embodiments, the express indication comprises a flag configured by the user.

In some embodiments, the express indication comprises a keyword that the classification scanner associates with enabling the classification.

In some embodiments, the express indication comprises administrator feedback.

Some embodiments of the disclosure may provide one or more technical advantages. A technical advantage of certain embodiments may include eliminating user error by applying machine learning to elements of electronic messages the user is unlikely or unable to review, including but not limited to files and attachments, metadata, hyperlinks and their content, and other electronic messages being transmitted within the network or by similar users outside the network. For example, one user may attach a large file to an electronic message that on its face does not appear to need encryption. The machine leaning scanner is operable to scan the large file much faster than a human user and can determine that the file does need encryption. The machine learning scanner can then send that electronic message to an enforcer configured to apply the proper encryption before the electronic message reaches its intended recipient. In certain embodiments, the machine learning scanner may instruct the enforcer that more than one classification applies to a single electronic message. For example, the machine learning scanner may determine that an electronic message needs to be both encrypted and quarantined. Thus, certain embodiments may reduce the risk of human error by automatically applying the required classification or classifications to an electronic message. Additionally, in certain embodiments, the use of machine learning enables a lexicon to be dynamically built. In the past, users had to create or purchase custom, stagnant lexicons. Machine learning allows for a lexicon to learn from and adapt to different user preferences over time, eliminating the need to update a static lexicon at regular intervals.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
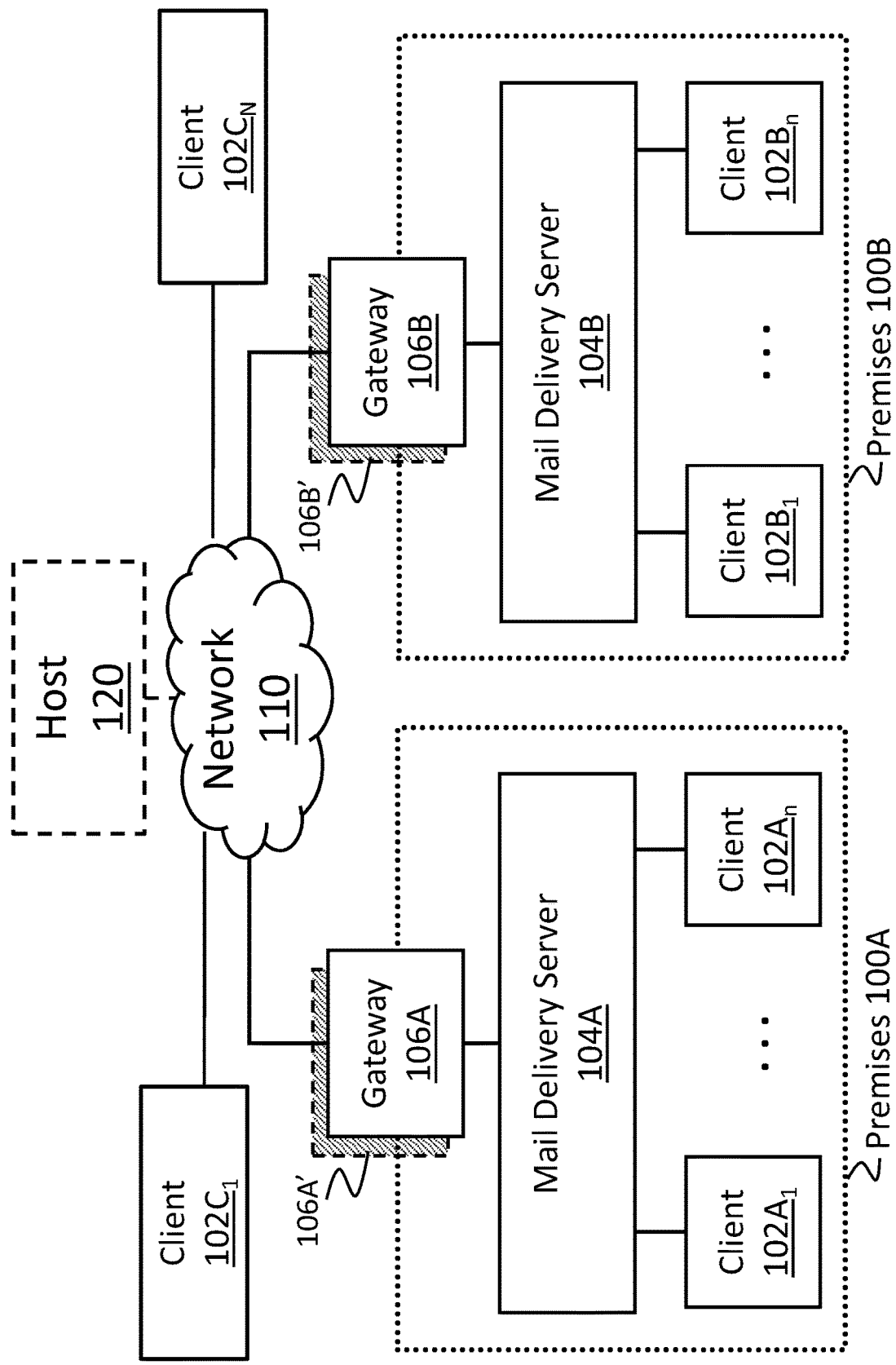
FIG. 1 illustrates an example of a computer network for delivery of an electronic message, in accordance with certain embodiments.

Embodiments of the present invention are described in FIGS. 1-7 of the drawings, like numerals being used for like and corresponding parts of the various drawings.

When sending an electronic message to a recipient, a sender may request that the electronic message be handled in a certain way. In some cases, instructions for handling the electronic message may be provided manually. For example, a user may provide instructions for handling the message via an interface that allows the user to type a command, click a button, select a menu item, etc. However, errors can occur when relying on the user to manually provide such instructions. For example, the user may occasionally forget to provide instructions or may inadvertently provide incorrect instructions. To address this problem, computing systems may implement policies that provide rules for handling electronic messages. As an example, a policy may indicate that electronic messages containing certain key words are to be encrypted. Developing robust policies can be difficult. Different users may have different preferences as to which characteristics should cause an electronic message to be handled in a particular way. Additionally, the characteristics that should cause an electronic message to be handled in a particular way may change over time, which means the policies may become outdated.

Certain embodiments of the present disclosure provide techniques for developing robust policies and ensuring that the policies are up-to-date. According to certain embodiments, machine learning can be used to build policies for handling electronic messages. As an example, a user may electronically indicate electronic messages that need to be encrypted. Machine learning can be used to classify the electronic messages and determine which attributes of the electronic messages to include in an encryption policy. The encryption policy may then be applied to future electronic messages. The future electronic messages may be scanned for attributes that the policy associates with encryption to determine whether the future electronic messages should be encrypted.

Users may use any suitable technique to electronically indicate which electronic messages need to be encrypted. As an example, prior to sending the electronic message, a user may configure a flag indicating that the electronic message should be encrypted. The flag may be configured in any suitable manner, such as by typing a command, clicking a button, selecting a menu item, etc. In some embodiments, if the flag indicates that the electronic message should be encrypted, a header may be added to the electronic message to ensure that the electronic message is sent to an encryption module. As another example, prior to sending the electronic message, the user can prepare the electronic message in a manner that the user knows will invoke encryption. In some embodiments, customers can build keyword policies that will cause an electronic message to be encrypted. Customers often use these types of policies to allow users to specify which emails need to be encrypted, often by watching for the word "Encrypt" in a subject line. As another example, after sending the electronic message, a user (such as an administrator) can provide feedback indicating that the electronic message contains attributes that warrant encryption. In some embodiments, the administrator can mark archived messages as "encrypt" or "not encrypt" messages. Examples of products that enable a user to indicate that an electronic message needs to be encrypted include ZixSelect and ZixDLP (which support Encrypt & Send flags) and ZixArchive (which supports administrator feedback).

Once electronic messages have been identified as requiring (or not requiring) encryption based on the express indication of the user, the electronic messages may be fed to a machine learning engine. Consider an email, for example. The email subject, body, attachment types, attachment text, metadata, and whether the email should be encrypted may be fed into a machine learning engine, like scikit or TensorFlow. The machine learning engine would create and train a classification model based on the information given in order to develop a machine learning policy that identifies whether the email should be encrypted. Once the machine learning engine has been provided with enough data to reach a relatively high level of accuracy, potentially thousands of emails, new emails that are not flagged or otherwise explicitly marked as encrypted may be scanned according to the machine learning policy to see if any of them should be encrypted.

FIG. 1 illustrates an example of a computer network for delivery of an electronic message, in accordance with certain embodiments. The computer network may include a plurality of clients 102 operable to send and receive electronic messages via an interconnecting network 110. Each client 102 may include any suitable combination of hardware and/or software, such as one or more interfaces, processing circuitry, and/or one or more memories, examples of which are described in more detail with respect to FIG. 5 below. In certain embodiments, client 102 may refer to a user device (e.g., a laptop computer, desktop computer, mobile phone, etc.) or an application of the user device through which a user accesses the user's mailbox to compose outbound emails, view inbound emails, and so on, such as Microsoft Outlook®, Lotus Notes®, Google Gmail®, a secure mail plug-in, etc. The user may refer to any suitable user, such as the sender of the message or an administrator (e.g., an information technology specialist authorized to manage computing resources or services used by the sender of the message).

In certain embodiments, the computing network includes one or more mail delivery servers 104 and gateways 106 to facilitate communicating email between clients 102 via network 110. A mail delivery server 104 may refer to a server that delivers email to the user's mailbox. As one example, a Microsoft Exchange®) server may be used as mail delivery server 104. In some embodiments, mail delivery server 104 may correspond to a particular domain. For example, mail delivery server 104A may correspond to Company A and may deliver emails to and from the domain @CompanyA.com. Mail delivery server 104B may deliver emails within a different domain, such as @CompanyB.com, and may deliver emails to and from mail applications associated with Company B.

Gateway 106 may refer to a mail relay positioned between a private network (such as Company A's network) and an outside network (such as the Internet or Company B's network). In some embodiments, gateway 106 may be positioned at the edge of the private network. As an example, gateway 106A may receive email from mail delivery server 104A, apply policies for sending email to the outside network, and then forward the email to the outside network (e.g., via network 110). Similarly, gateway 106A may receive email from the outside network (e.g., via network 110), apply policies for receiving email from the outside network, and then forward the email to mail delivery server 104A for delivery to the appropriate mailbox. In some embodiments, redundant gateways may be used to provide load balancing, disaster recovery, or other redundancy. For example, gateway 106A' may operate as a redundant gateway for gateway 106A. In embodiments in which gateway 106A maintains a local copy of a machine learning policy, redundant gateway 106A' may also maintain a local copy of the machine learning policy so that either gateway is prepared to apply the policy to email.

In the example shown in FIG. 1, clients $102A_{1-N}$, mail delivery server 104A, and gateway 106A are associated with premises 100A, and clients $102B_{1-N}$, mail delivery server 104B, and gateway 106B are associated with premises 100B. A premises 100 may refer to a private network or domain associated with an entity, such as Company A or Company B. In some embodiments, premises 100A may comprise computing equipment, such as mail delivery server 104A and gateway 106A, physically located on-site in a building of Company A. As further discussed below, in certain embodiments, on-premises computing equipment may be used to provide some or all of the functionality associated with generating and applying machine learning policies. In addition, or in the alternative, a host 120 may be used to provide some or all of the functionality associated with generating and applying machine learning policies.

As shown in FIG. 1, the computer network may optionally include one or more hosts 120, depending on the embodiment. Host 120 may provide computing services to clients 102 via network 110. For example, network 110 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding. In some embodiments, host 120 may be administered by a third party (e.g., a party other than Company A or Company B), such as a third-party encryption service. Host 120 may provide computing services to any of clients $120A_{1-N}$ associated with Company A, clients $120B_{1-N}$ associated with Company B, and/or clients $102C_{1-N}$ (which need not be associated with a particular company and need not be delivered through mail delivery server 104 and gateway 106). In certain embodiments, host 120 may comprise a secure webmail delivery portal, such as a ZixPort®, that provides secure webmail accounts to users.

In some embodiments, the components of the computer network illustrated in FIG. 1 may communicate using a shared protocol, such as Simple Mail Transfer Protocol (SMTP). In other embodiments, certain components may communicate using different protocols in which case protocol converters may be included to convert between the different protocols.

FIGS. 2A-2B, 3A-3C, and 4 illustrate examples of components that may be included in the computer network of FIG. 1. The components may be included in any suitable location within the computer network, such as within client 102, mail delivery server 104, gateway 106, and/or host 120. For example, in certain embodiments, the components may be located within a gateway 106. In other embodiments, the components may be located within host 120. In other embodiments, the components may be distributed throughout the network. For example, some of the components may be located within a gateway 106 and other components may be located within host 120.

Figure 2A:
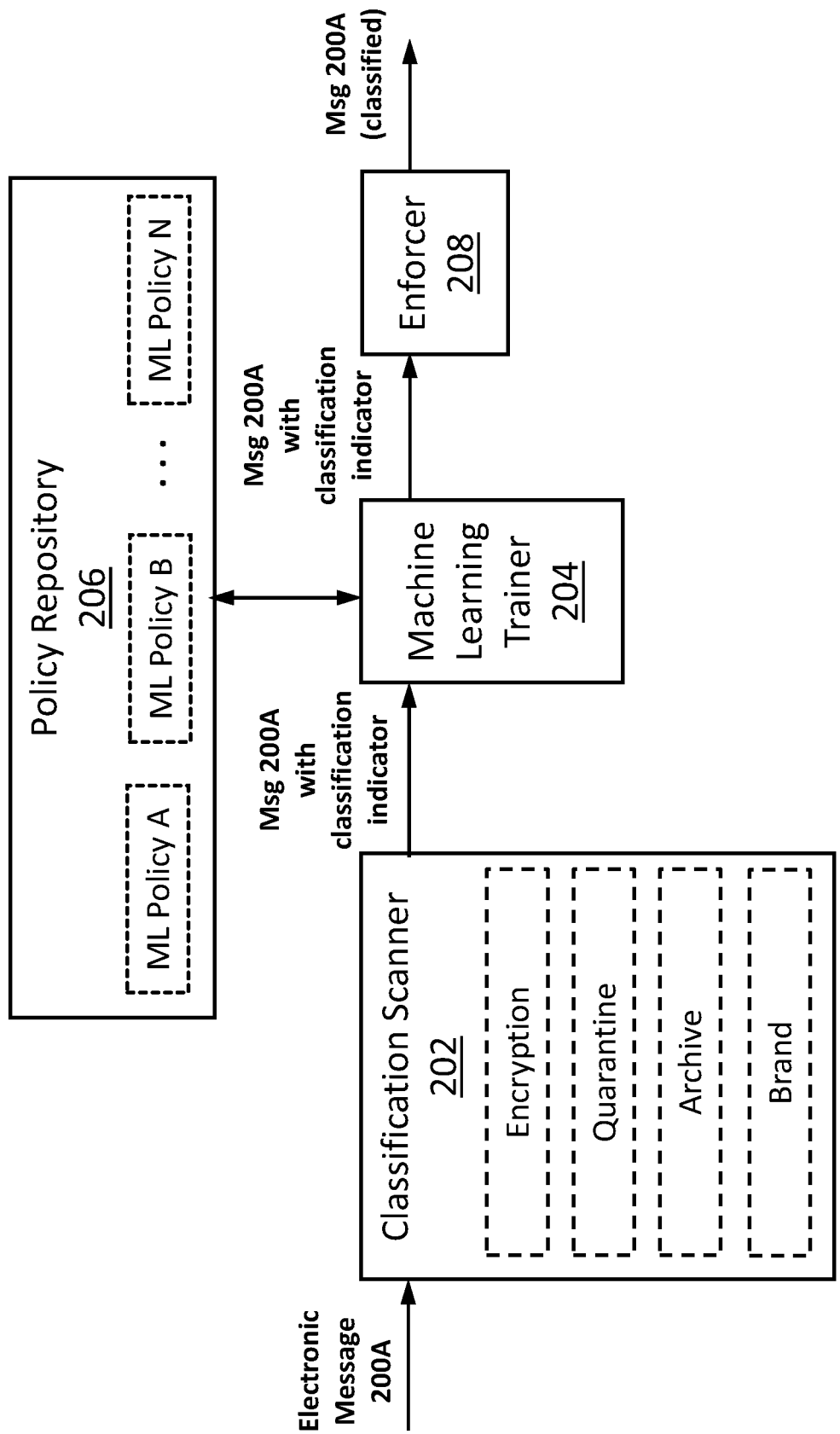
FIGS. 2A-2B illustrate an example of components that may be included in the computer network and that may facilitate generating a machine learning policy, in accordance with certain embodiments.
Figure 2B:
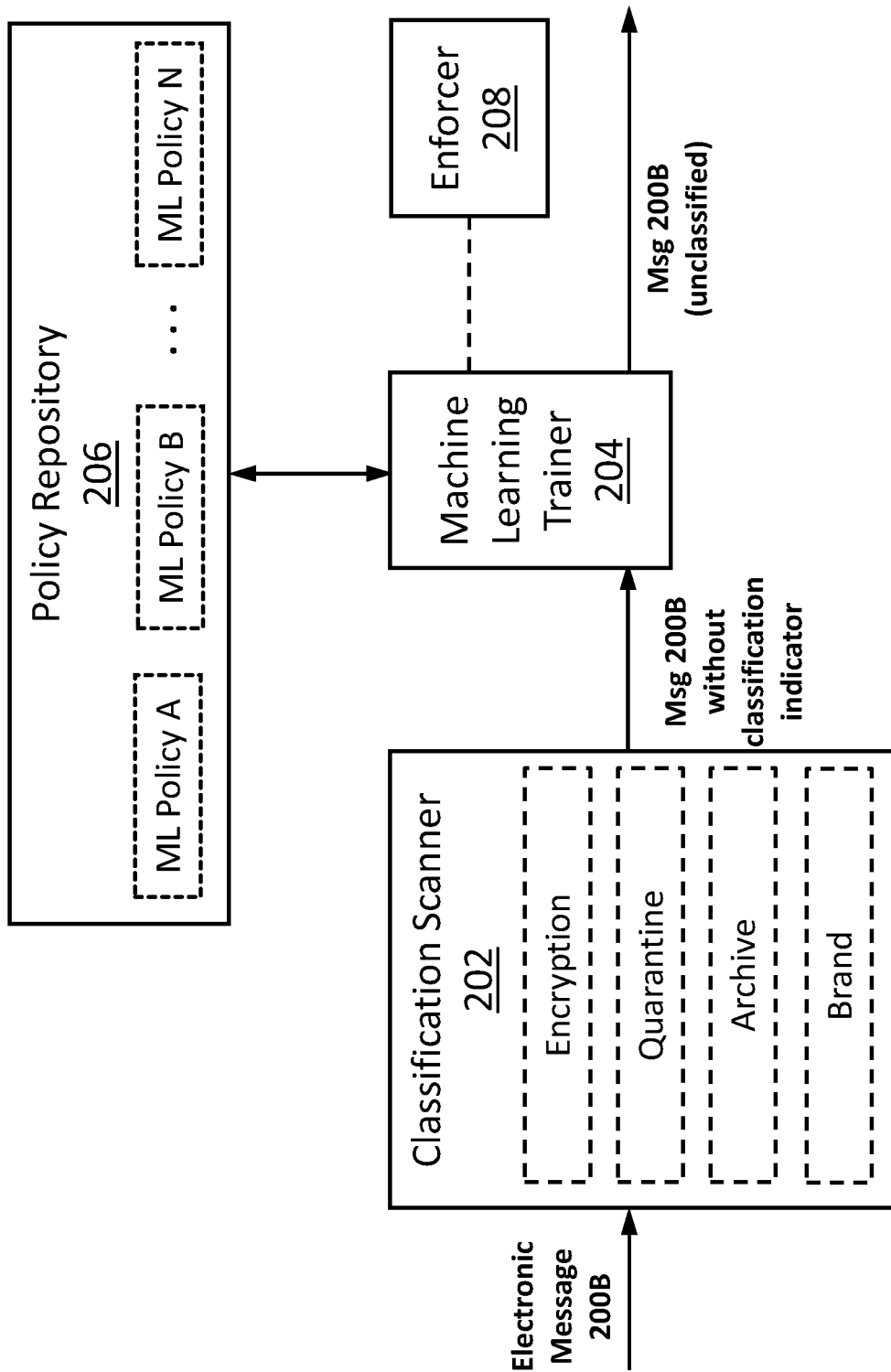

FIGS. 2A-2B illustrate an example of components that may be included in the computer network and that may facilitate generating a machine learning policy, in accordance with certain embodiments. The components illustrated in FIGS. 2A-2B include a classification scanner 202, a machine learning trainer 204, a policy repository 206, and an enforcer 208.

Classification scanner 202 receives an electronic message 200 from a user via client 102. In certain embodiments, the user from whom electronic message 200 is received may be a sender of electronic message 200 or an administrator authorized to manage electronic message 200. Examples of electronic message 200 may include an email, SMTP message, text message, instant message, voice message, and/or an attachment to a secondary electronic message. Classification scanner 202 determines whether the user has expressly indicated that a classification applies to electronic message 200. For example, classification scanner 202 may include one or more scanners adapted to scan the electronic message to determine whether the user has expressly indicated that a certain classification applies. In some embodiments, a classification may be used to ensure that the electronic message complies with a policy, a rule, a user preference, or other compliance criteria associated with the classification. Examples of classifications that may apply to electronic message 200 include encryption (or non-encryption), quarantine (or non-quarantine), archive (or non-archive), and/or brand (or non-brand) classifications. Accordingly, classification scanner 202 may include an encryption scanner, a quarantine scanner, an archive scanner, a brand scanner, and/or other suitable scanner(s).

The encryption scanner determines whether the user has expressly indicated that the electronic message is to be encrypted. The quarantine scanner determines whether the user has expressly indicated that the electronic message is to be quarantined. As an example, a user may indicate to quarantine certain electronic messages in order to perform security procedures, such as malware detection and remediation. The archive scanner determines whether the user has expressly indicated that the message is to be archived. As an example, a user may indicate to archive an important electronic message in a database or file management system for future reference. The brand scanner determines whether the user has expressly indicated that the message is to be branded. As an example, a user may indicate to brand the electronic message with a business logo or trade dress, a designation (e.g., "confidential," "proprietary," "draft"), a watermark (e.g., recipient's name, date, etc.), or other information.

Classification scanner 202 may include various types of scanners within the same scanner (as shown in FIGS. 2A-2B), or different types of scanners may be provided in separate classification scanners 202. Any suitable number of scanners may be used, and certain types of scanners may be added or omitted, depending on the embodiment. Additionally, certain scanners may be configured to scan outbound electronic messages, certain scanners may be configured to scan inbound electronic messages, and certain scanners may be configured to scan both outbound and inbound electronic messages.

As described above, classification scanner 202 determines whether the user has expressly indicated that a classification applies to electronic message 200. When sending electronic message 200, the user may expressly indicate that a classification applies by typing a command, clicking a button, selecting a menu item, or using any other suitable technique to configure a flag indicating that a classification applies, or the user may include a keyword that classification scanner 202 associates with enabling the classification (such as including the word "encrypt" in the subject line of an email to enable an encryption classification). Additionally, certain embodiments enable a user (sender or administrator) to provide feedback that expressly indicates that a previously sent electronic message 200 should be used to train machine learning trainer 204 with respect to the classification. As an example, an administrator may review archived electronic messages 200 and may expressly indicate how machine learning trainer 204 should classify the archived electronic messages 200.

Classification scanner 202 provides electronic message 200 to machine learning trainer 204 and, if the user has expressly indicated that a classification applies, classification 202 also provides machine learning trainer 204 with an identification of the classification that applies to the electronic message 200.

Machine learning trainer 204 may comprise a machine learning engine, like scikit or TensorFlow, adapted to determine (e.g., generate or update) a machine learning (ML) policy by associating attributes of the electronic message 200 with the applicable classification. The machine learning engine may use any suitable classification model or machine learning algorithm (including any deep learning algorithms or neural network tools) to determine a machine learning policy. A machine learning policy may be determined for a particular type of classification (such as encryption) or a combination of classifications. As an example, a machine learning policy may include a rule that an electronic message with attributes A, B, and C should be encrypted and archived, and the machine learning policy may include another rule that an electronic message with attributes A, B, and D should be encrypted and branded.

Examples of attributes that may be included in a machine learning policy include the presence or absence of certain words or phrases, the frequency with which certain words or phrases appear in the electronic message, the sender of the electronic message, the recipient of the electronic message, the domain of the sender, the domain of the recipient, message size, whether the electronic message includes certain attachments, whether the electronic message includes links to certain data, whether the electronic message is associated with certain metadata, whether the electronic message or its contents are associated with certain computing resources (such as a private/classified portion of a network or storage media), the date of the electronic message, other suitable attributes, or any combination of the preceding. As one example, if machine learning trainer 204 detects that the user has expressly indicated to encrypt at least a threshold number or threshold percentage of messages containing the word "confidential" in the subject line, machine learning trainer 204 may determine a machine learning policy that causes future messages containing the word "confidential" in the subject line to be encrypted.

Machine learning trainer 204 may communicate with policy repository 206 to store and retrieve one or more machine learning policies, such as ML policy A, ML policy B, . . . and ML policy N. Policy repository 206 may comprise any suitable computer-readable storage medium, such as local memory of machine learning trainer 204, an external database that machine learning trainer 204 may access via a network, or other computer-readable storage medium. Each ML policy may be associated with either a particular user or with a group of users having one or more characteristics in common. As an example, an ML policy may be associated with all of the employees of Company A, with all of the members of department X within Company A, with all of the customers of host 120 that belong to the same industry (e.g., an ML policy for the medical industry may be trained to recognize and encrypt electronic messages containing patient records, and that ML policy could be applied to different customers in the medical industry, such as Hospital A and Hospital B), or any other group.

When machine learning trainer 204 receives electronic message 200 from classification scanner 202, machine learning trainer 204 may generate a new machine learning policy to be stored in policy repository 206 or may train an existing machine learning policy retrieved from policy repository 206. In certain embodiments, classification scanner 202 indicates to machine learning trainer 204 which machine learning policy should be trained based on electronic message 200 (e.g., ML policy A. B, . . . or N). In certain embodiments, electronic messages 200 from different users having one or more characteristics in common may be used to train the same machine learning policy. In certain embodiments, one electronic message 200 may be used to train multiple machine learning policies. For example, if the sender of electronic message 200 is a member of department X of Company A, electronic message 200 may be used to train both a first policy associated with department X and a second policy associated with Company A.

Optionally, electronic message 200 may be sent to an enforcer 208 adapted to apply one or more classifications. For example, FIG. 2A illustrates an example in which classification scanner 202 receives electronic message 200A from the user, determines that the user has expressly indicated one or more classifications that apply to electronic message 200A, and provides machine learning trainer 204 with electronic message 200A and an indication of which classification(s) apply. Machine learning trainer 204 uses electronic message 200A to train one or more machine learning policies. Machine learning trainer also provides enforcer 208 with electronic message 200A and an indication of which classification(s) apply. Enforcer 208 applies the indicated classifications. For example, enforcer 208 may encrypt, quarantine, archive, and/or brand electronic message 200A depending on which classification(s) apply.

FIG. 2B illustrates an example of bypassing enforcer 208. In FIG. 21B, classification scanner 202 receives electronic message 200B from the user, determines that the user has not expressly indicated any classifications that apply to electronic message 200B, and provides machine learning trainer 204 with electronic message 200B and an indication that the classifications do not apply. Machine learning trainer 204 uses electronic message 200B to train one or more machine learning policies. Machine learning trainer also sends electronic message 200B to the intended recipient of electronic message 2008, bypassing enforcer 208, because electronic message 200B does not need to be encrypted, quarantined, archived, branded, or otherwise treated by enforcer 208.

Although FIGS. 2A and 2B illustrate examples in which machine learning trainer 204 sends electronic message 200 to the intended recipient (either directly or via enforcer 208), in other embodiments machine learning trainer need not send electronic message 200 to the intended recipient. For example, in certain embodiments, classification scanner 202 may send one copy of electronic message 200 to machine learning trainer 204 in order to train a machine learning policy, and classification scanner 202 may send another copy of electronic message 200 to the intended recipient (either directly or via enforcer 208, e.g., depending on whether the user has expressly indicated any classification to apply to electronic message 200). As another example, in certain embodiments, classification scanner 202 may provide machine learning trainer 204 with archived/previously sent electronic messages 200 for training purposes. Such archived/previously sent electronic messages 200 need not be sent to the recipient.

Figure 3A:
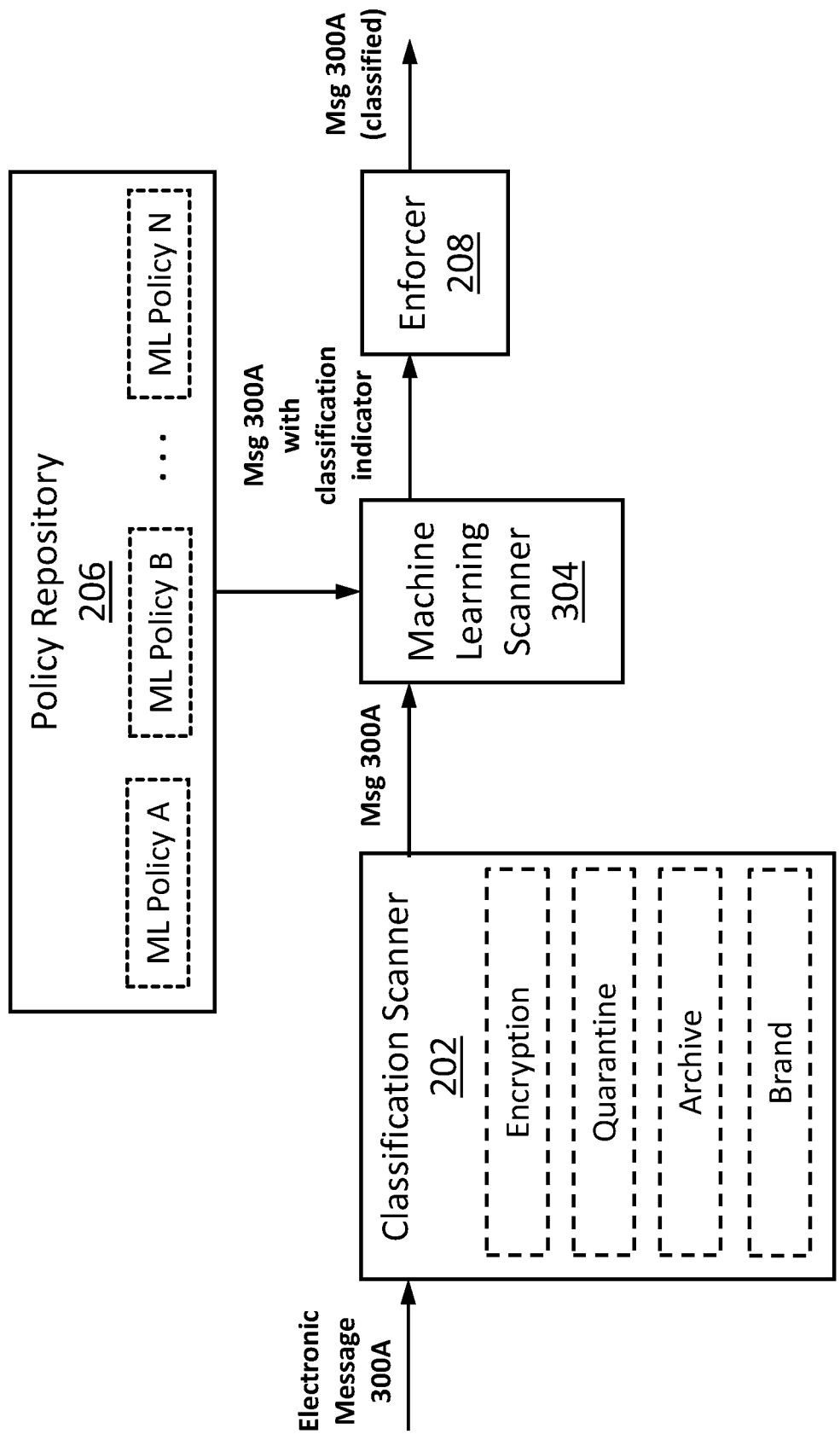
FIGS. 3A-3C illustrate an example of components that may be included in the computer network and that may facilitate applying a machine learning policy, in accordance with certain embodiments.
Figure 3B:
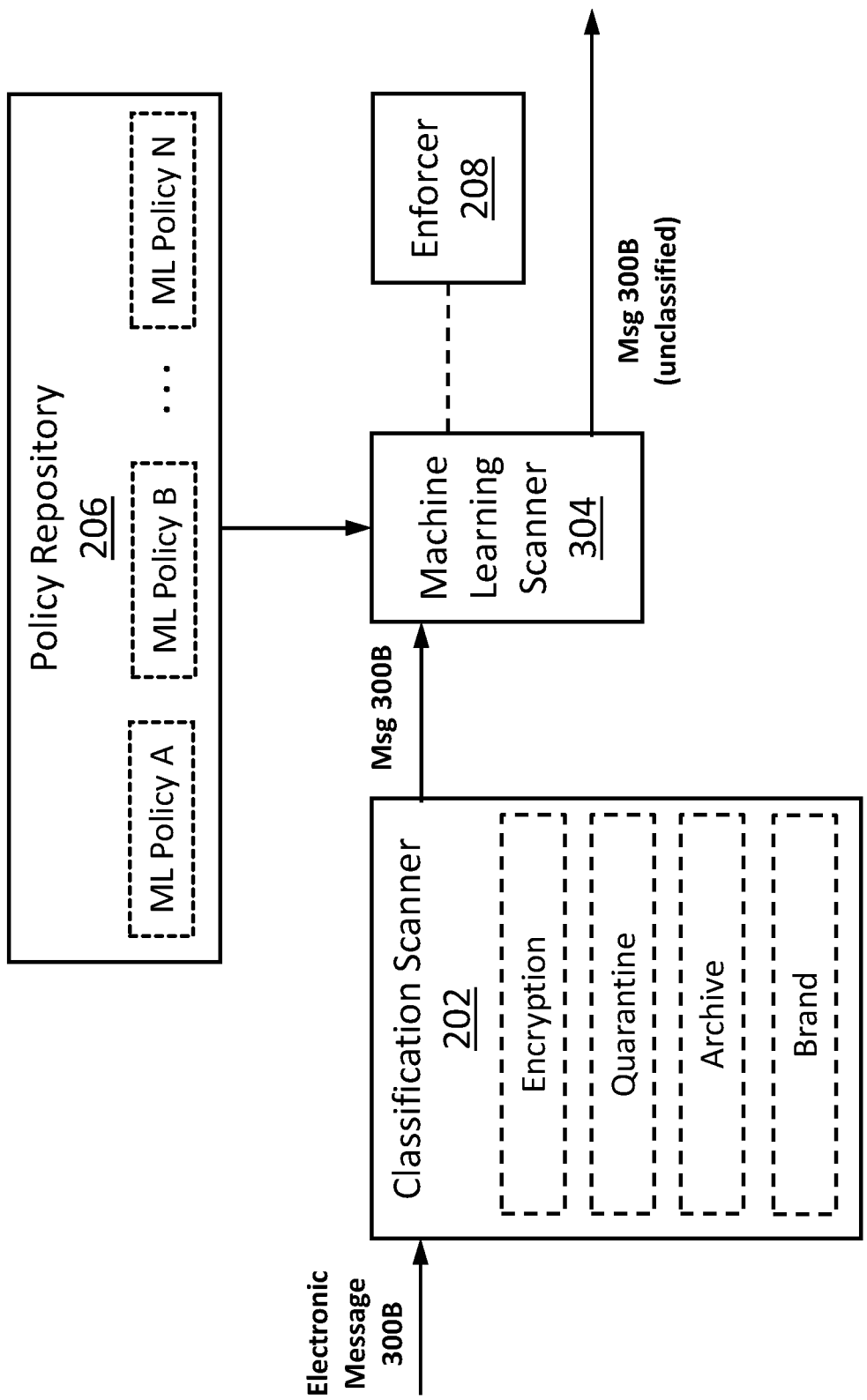
Figure 3C:
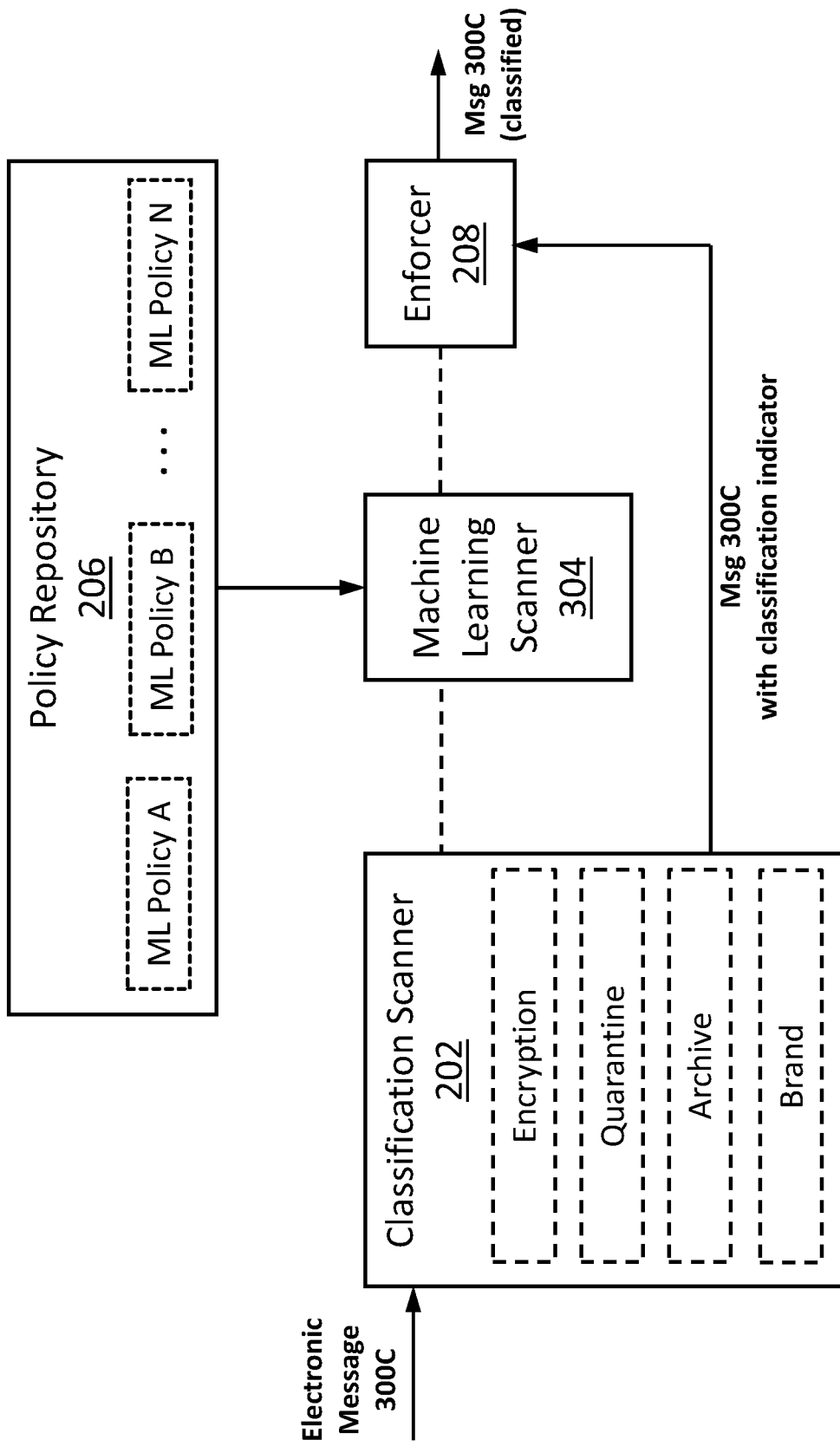

FIGS. 3A-3C illustrate an example of components that may be included in the computer network and that may facilitate applying a machine learning policy, in accordance with certain embodiments. FIGS. 3A-3C include a classification scanner 202, machine learning scanner 304, policy repository 206, and enforcer 208. Classification scanner 202, policy repository 206, and enforcer 208 may be similar to those described with respect to FIGS. 2A-2C. As further explained below, machine learning scanner 304 uses a machine learning policy to determine whether a classification applies to the electronic message.

In FIG. 3A, classification scanner 202 receives electronic message 300A from a user. Classification scanner 202 scans message 300A to determine whether the user has expressly indicated that a classification applies. As described above, classification scanner 202 may include a single scanner or multiple scanners (e.g., encryption, quarantine, archive, and/or brand scanners). For ease of explanation, suppose classification scanner 202 includes only an encryption scanner. In response to determining that the user has not expressly indicated that a classification (e.g., encryption) applies, classification scanner 202 sends message 300A to machine learning scanner 304. Machine learning scanner 304 is adapted to use a machine learning policy obtained from policy repository 206 to determine whether a classification (e.g., encryption) applies to electronic message 300A. In some embodiments, machine learning scanner 304 receives information from classification scanner 202 that enables machine learning scanner 304 to determine which of a plurality of machine learning policies to apply. For example, classification scanner 202 may send machine learning scanner 304 an identifier associated with a particular machine learning policy. As another example, classification scanner 202 may send machine learning scanner 304 information that enables machine learning scanner 304 to identify the sender or a group to which the sender belongs, and machine learning scanner 304 may map electronic message 300A to a machine learning policy associated with the sender/group.

In the example illustrated in FIG. 3A, machine learning scanner 304 determines that a classification (e.g., encryption) applies to electronic message 300A. Machine learning scanner 304 provides enforcer 208 with electronic message 300A and an indication of which classification applies. Enforcer 208 applies the classification and sends the classified message 300A to the intended recipient. As an example, a machine learning policy may indicate that message with the word "confidential" in the subject line should be encrypted. In response to detecting the word "confidential" in the subject line of electronic message 300A, machine learning scanner 304 sends enforcer 208 an indication to encrypt electronic message 300A. Enforcer 208 performs encryption before sending electronic message 300A to the intended recipient.

Turning now to an example in which classification scanner 202 includes multiple scanners (e.g., encryption, quarantine, archive, and/or brand scanners). In certain embodiments, classification scanner 202 may determine that the user has expressly indicated that certain classifications apply (such as encryption) but has not expressly indicated whether or not the other classifications apply. In this case, classification scanner 202 may send message 300A to machine learning scanner 304 with an indication that encryption does apply and an instruction to scan electronic message 300A according to a machine learning policy to determine if any other classifications apply. Machine learning scanner 304 provides electronic message 300A to enforcer 208 with an indication to apply encryption and any other classifications that the machine learning scanner 304 determines should be applied according to the machine learning policy.

FIG. 3B is similar to FIG. 3A except that machine learning scanner 304 determines that the machine learning policy does not require applying any classification to electronic message 300B. Accordingly, machine learning scanner 304 bypasses enforcer 208 and sends electronic message 300B to the intended recipient without any encryption/quarantine/archiving/branding.

FIG. 3C is similar to FIGS. 3B and 3A except that classification scanner 202 determines that the user has expressly indicated how to classify electronic message 300C. Accordingly, classification scanner 202 bypasses machine learning scanner 304 and sends electronic message 300C directly to enforcer 208. Classification scanner 202 instructs enforcer 208 to apply classification (e.g., encrypt, quarantine, archive, and/or brand) to electronic message 300C according to the express indication of the user. Enforcer 208 applies the classification and sends electronic message 300C to the intended recipient.

Figure 4:
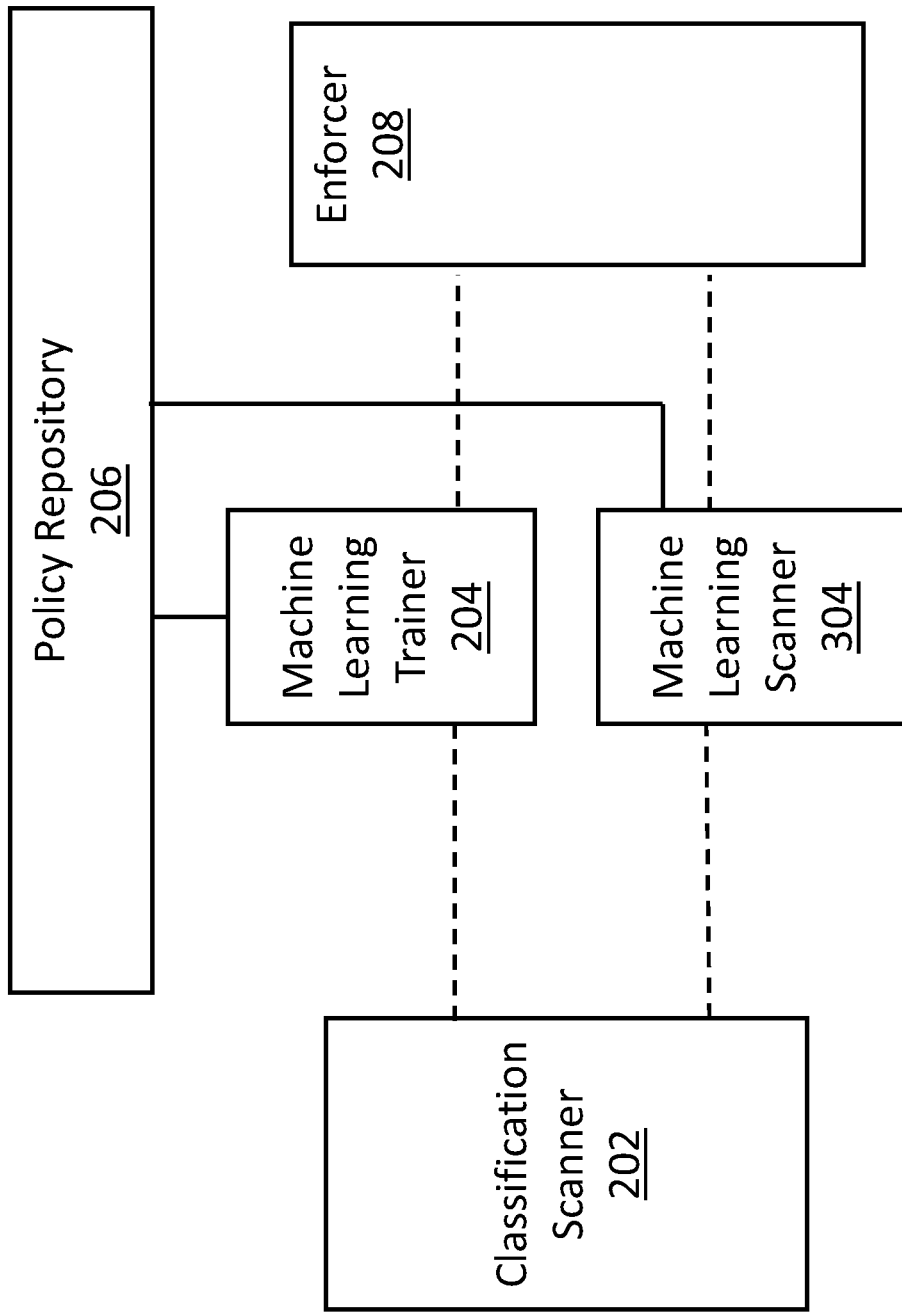
FIG. 4 illustrates an example that combines components from FIGS. 2A-2B with components from FIGS. 3A-3C, in accordance with certain embodiments.

FIG. 4 illustrates an example that combines components from FIGS. 2A-2B with components from FIGS. 3A-3C, in accordance with certain embodiments. The example in FIG. 4 includes both a machine learning trainer 204 and a machine learning scanner 304, which may both receive electronic messages from classification scanner 202. For example, classification scanner 202 may send an electronic message to machine learning trainer 204. Machine learning trainer 204 may determine a machine learning policy that associates attributes of the electronic message with the applicable classification and may generate a new machine learning policy to be stored in policy repository 206 or may train an existing machine learning policy already stored in policy repository 206. Classification scanner 202 may also send an electronic message to machine learning scanner 304. Machine learning scanner 304 is adapted to use a machine learning policy obtained from policy repository 206 to determine whether a classification applies to electronic message 300. Thus, machine learning trainer 204 may continue to generate and/or update machine learning policies while machine learning scanner 304 scans electronic messages according to available machine learning policies.

Figure 5:
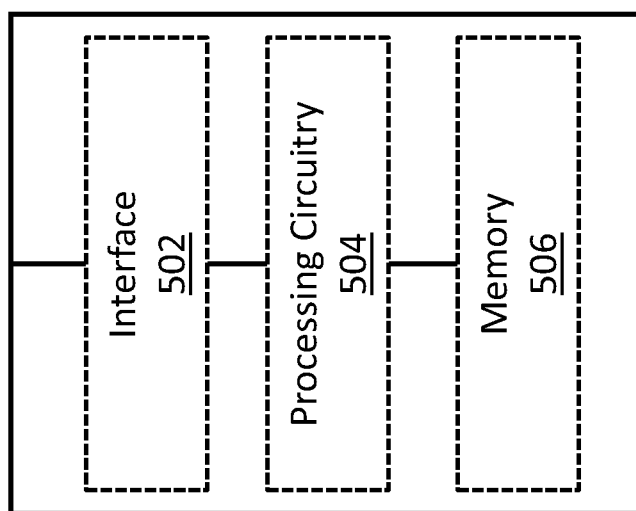
FIG. 5 illustrates examples of elements that may be included in one or more components of the computer network described with respect to FIGS. 1-4, in accordance with certain embodiments.

FIG. 5 illustrates examples of elements that may be included in one or more components of the computer network described with respect to FIGS. 1-4, in accordance with certain embodiments. For example, any of clients 102, mail delivery servers 104, gateways 106, host 120, classification scanner 202, machine learning trainer 204, machine learning scanner 304, policy repository, and/or enforcer 208 may include an interface 502, processing circuitry 504, memory 506, and/or any other suitable elements. Interface 502 receives input, sends output, processes the input and/or output, and/or performs other suitable operation. Interface 502 may comprise hardware and/or software.

Processing circuitry 504 performs the operations of the component, for example, executes instructions to generate output from input. Processing circuitry 504 may include hardware, software, and/or other processing circuitry. Processing circuitry 504 may be encoded in one or more tangible media and may preform operations when executed by a computer. Certain processing circuitry, such as a processor, may manage the operation of a component. Examples of processing circuitry (or a processing unit) include one or more computers, one or more microprocessors, one or more applications, and/or other processing circuitry. In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 506 (or memory unit) stores information. Memory 506 may comprise one or more non-transitory, tangible, computer-readable, and/or computer-executable storage media. Examples of memory 506 include computer memory (for example, Random Access Memory (RAM) or Read Only Memory (ROM), mass storage media (for example, a Compact Disk (CD) or a Digital Video Disk (DVD)), database, and/or network storage (for example, a server), and/or other computer-readable medium.

Figure 6:
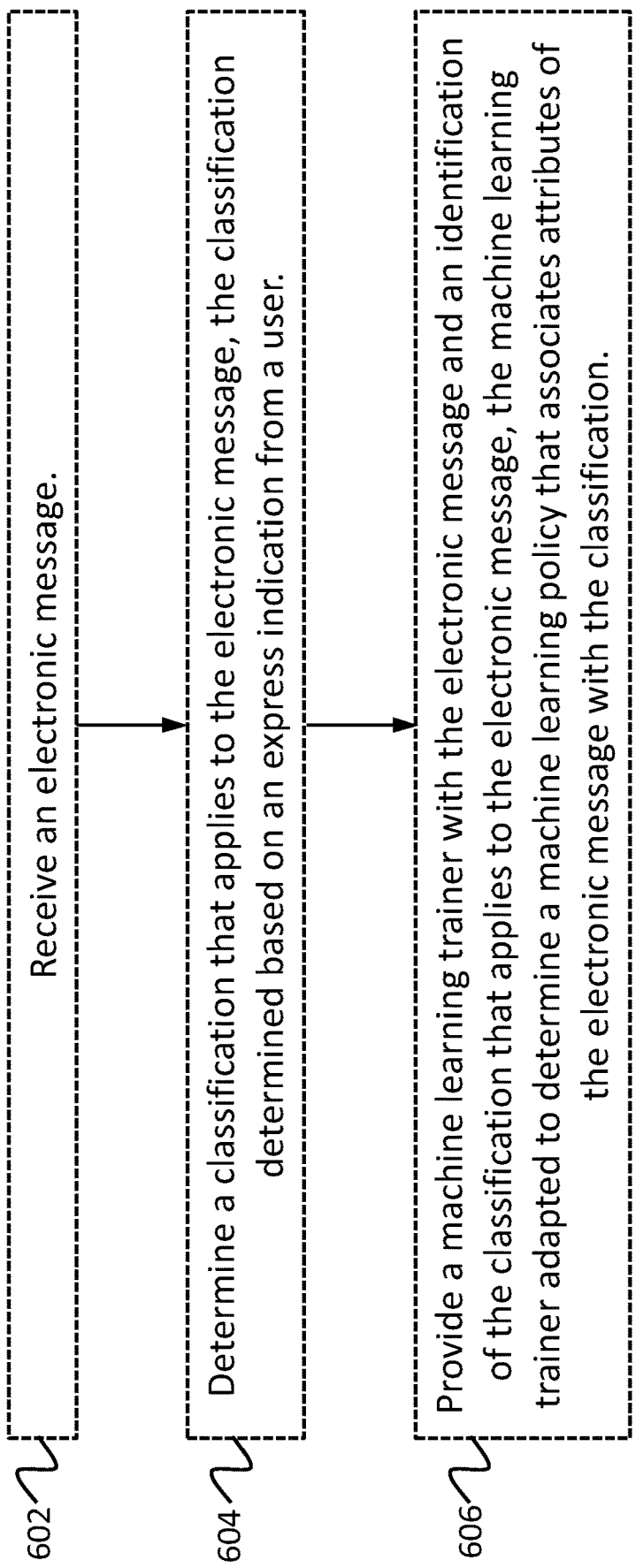
FIG. 6 illustrates an example of a method for creating a machine learning policy based on express indicators, in accordance with certain embodiments.

FIG. 6 illustrates an example of a method for creating a machine learning policy based on express indicators, in accordance with certain embodiments. In certain embodiments, the method may be performed by classification scanner 202. The method may begin at step 602 by receiving an electronic message. For example, classification scanner 202 may receive message 200.

At step 604, the method determines a classification that applies to the electronic message at classification scanner 202 based on an express indicator from a user (such as a sender of the electronic message or an administrator). Examples of express indicators include a flag configured by the user (e.g., by typing a command, clicking a button, or selecting a menu item) or a keyword that the classification scanner associates with enabling the classification (such as the presence of the word "encrypt" in the subject line). The user may provide the express indicator when sending the electronic message to an intended recipient. In addition, or in the alternative, the user may provide the express indication as feedback associated with an electronic message that was previously sent (e.g., an administrator may select certain archived messages to train machine learning trainer 204). As described above, examples of classifications that may apply to an electronic message include encryption, quarantine, archive, and/or brand applies to electronic message 200.

In certain embodiments, the classification may indicate that best mode of delivery encryption applies to electronic message 200. Best mode of delivery encryption may be used to select among a number of possible encryption modes. For example, suppose that enforcer 208 is capable of encrypting the electronic message according to any of encryption modes A, B, C, D, or E. The encryption modes are prioritized in order with A having the highest priority (e.g., strongest encryption mode) and E having the lowest priority (e.g., weakest encryption mode). If the intended recipient of the electronic message only supports encryption modes B, D, and E, enforcer 208 encrypts the electronic message according to encryption mode B, which is the best mode available.

At step 606, the method provides machine learning trainer 204 with electronic message 200 and an identification of the classification that applies to electronic message 200. Machine learning trainer 204 is adapted to determine a machine learning policy that associates attributes of electronic message 200 with the classification and to store the machine learning policy in policy repository 206. As describe above, determining a machine learning policy may comprise generating a new policy or updating an existing policy. In certain embodiments, machine learning trainer 204 the machine learning policy to be generated/updated corresponds to one of a plurality of machine learning policies, and classification scanner 202 indicates to machine learning trainer 204 which of the machine learning policies to train with the electronic message. Additionally, in certain embodiments, classification scanner 2002 may indicate to train multiple machine learning policies with the electronic message.

In certain embodiments, the method further determines when at least a threshold number of electronic messages associated with a machine learning policy have been provided to machine learning trainer 204. The threshold number may be selected so that the machine learning trainer 204 receives enough training input, such as thousands of electronic messages, to ensure sufficient accuracy of the machine learning policy. In response to determining that at least the threshold number of electronic messages associated with the machine learning policy have been provided to machine learning trainer 204, the machine learning policy may be enabled. For example, the machine learning policy may be made available to machine learning scanner 304. Machine learning scanner 304 may use the machine learning policy to determine whether a classification (e.g., encryption, quarantine, archive, brand) should be applied to an electronic message for which the user did not expressly indicate to apply the classification. Meanwhile, machine learning trainer 204 may continue to receive electronic messages and dynamically update the machine learning policy in order to improve accuracy and ensure the machine learning policy is up-to-date.

Figure 7:
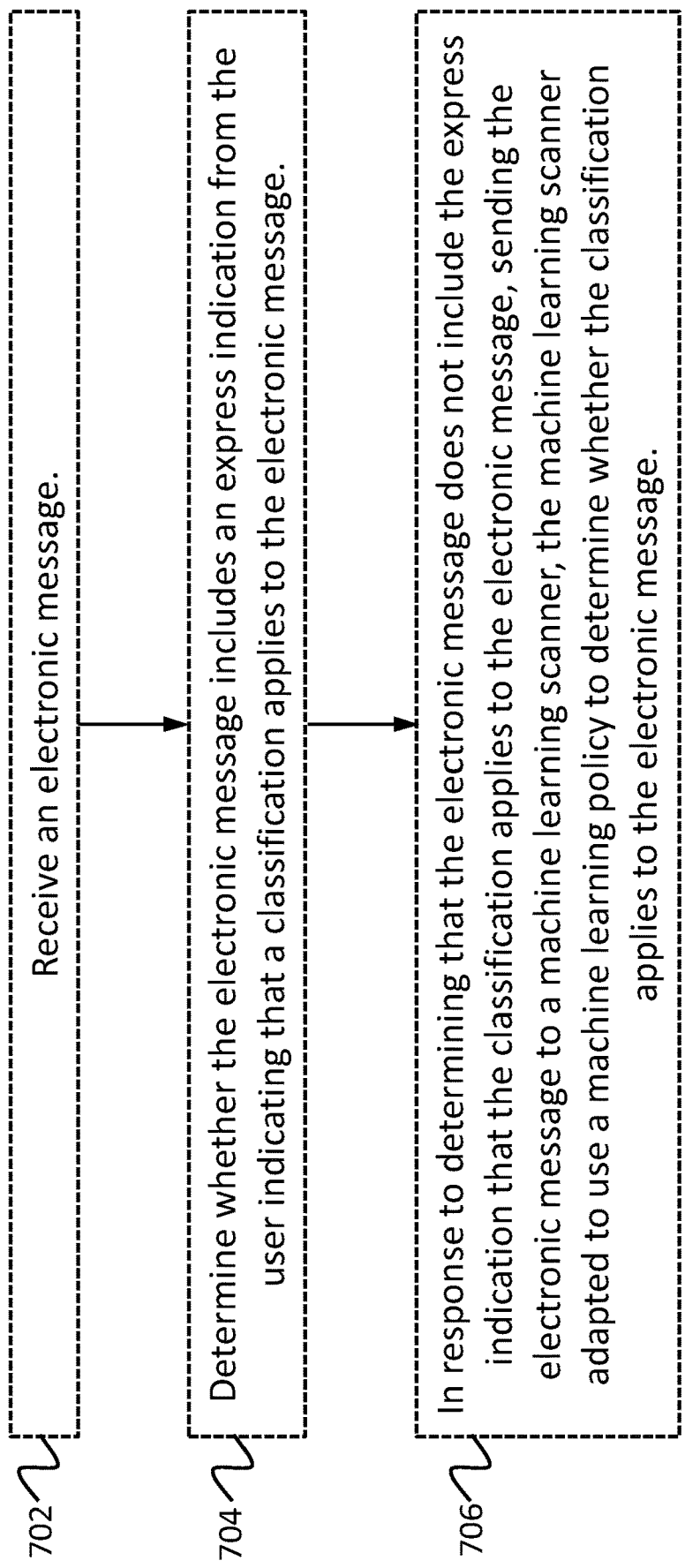
FIG. 7 illustrates an example of a method for delivery of an electronic message using a machine learning policy, in accordance with certain embodiments.

FIG. 7 illustrates an example of a method for delivery of an electronic message using a machine learning policy, in accordance with certain embodiments. In certain embodiments, the method may be performed by classification scanner 202. The method may begin at step 702 by receiving an electronic message. For example, classification scanner 202 may receive message 200 from a user.

At step 704, the method determines whether the electronic message includes an express indication from the user indicating that a classification (e.g., encrypt, quarantine, archive, and/or brand) applies to the electronic message. In some embodiments, the express indicator may include a flag configured by the user, a keyword that classification scanner 202 associates with enabling the classification, or administrator feedback. In certain embodiments, the classification may indicate that best mode of delivery encryption applies to electronic message 200.

At step 706, the method, in response to determining that electronic message 200 does not include the express indication that the classification applies to electronic message 200, sends electronic message 200. to machine learning scanner 304. Machine learning scanner 304 is adapted to use a machine learning policy stored in policy repository 206 to determine whether the classification applies to electronic message 200. In certain embodiments, machine learning scanner 304 is further adapted to determine whether to send the electronic message to enforcer 208 (see e.g., FIG. 3A) or bypass enforcer 208 (see e.g., FIG. 3B) depending on whether the machine learning policy indicates classification applies to the electronic message. Enforcer 208 is adapted to apply the classification.

In certain embodiments, the method is further operable to receive a second electronic message, determining whether the second electronic message includes an express indication from the user indicating that a classification applies to the second electronic message, and, in response to determining that the second electronic message includes the express indication that the classification applies to the second electronic message, send the second electronic message to enforcer 208. An example is provided with respect to FIG. 3C above in which classification scanner 202 bypasses machine learning scanner 304 if the electronic message includes an express indication from the user.

Certain embodiments of the present disclosure may provide one or more advantages. As an example, an advantage of certain embodiments allows for improving the accuracy of policies that determine whether to encrypt or otherwise classify an electronic message. For example, in the past, companies would hire encryption service providers to develop a lexicon of words that would trigger encryption. These lexicons may be vulnerable to inaccuracies. For example, the encryption service providers would not necessarily be aware of all the industry-specific terminology (such as medical jargon) or company-specific terminology (such as secret project names within a company) that would warrant encrypting the electronic message. Additionally, the lexicon may become outdated, for example, if the company routinely generates secret project names but fails to add the new secret project names to the lexicon. By contrast, embodiments of the present disclosure allow for using machine learning to continually train classification models based on express indications from users that are in a good position to know which attributes of an electronic message warrant a particular classification.

As another example, an advantage of certain embodiments allows for training and applying policies in a multi-tenant, hosted environment. For example, information can be gathered about the type of customer that sent an electronic message in the hosted environment. This way, similar customers can be tied together. For example, the same machine learning policy can be applied to both customers, or similar customers may each have their own machine learning policy based on the same machine learning policy (e.g., the same machine learning policy may be used as a baseline for similar customers and may be further trained for a specific customer, or some or all of the features from one customer's policies may be copied to a machine learning policy for a similar customer). In other words, in a hosted environment, it may be possible to identify similar customers and use them to train the classification models for each other, without affecting other customers. As an example, Hospital A and Hospital B may be similar customers in a hosted environment. A machine learning policy maintained by the host may learn to identify medical terms associated with electronic messages that Hospital A expressly indicates to encrypt. The host may apply the machine learning policy to Hospital B so that electronic messages from Hospital B containing the same medical terms will be encrypted even though Hospital B did not expressly request encryption, thereby providing increased security to electronic messages of Hospital B. In some embodiments, customers would be presented with an option of opting-in or opting-out of sharing a machine learning policy with other customers.

Modifications, additions, or omissions may be made to the systems and apparatuses disclosed herein without departing from the scope of the invention. For example, although certain embodiments have described using encrypting, quarantining, archiving, and/or branding as examples of classifications, other embodiments may use other classifications to ensure that the electronic message complies with one or more policies, rules, user preferences, and/or other compliance criteria associated with the classification.

The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, the method comprising:
   receiving, by a classification scanner, a first electronic message, the first electronic message outbound from a sender to a recipient;
   determining, by the classification scanner, a first classification type that applies to the first electronic message, the first classification type determined based on an express indication configured by the sender prior to sending the first electronic message to the recipient, the express indication indicating that the sender has requested that the first electronic message be handled in a manner that complies with a compliance criteria, wherein determining the first classification type comprises scanning the first electronic message by a plurality of scanners associated with the classification scanner, each scanner configured to scan the first electronic message for a respective classification type of a plurality of classification types;
   providing, by the classification scanner to a machine learning trainer, the first electronic message and an identification of the first classification type that applies to the first electronic message, the machine learning trainer adapted to determine a machine learning policy that associates attributes of the first electronic message with the first classification type;
   receiving, by an enforcer, a second electronic message, the second electronic message comprising one or more of the attributes that the machine learning policy associates with the first classification type; and
   enforcing, by the enforcer, handling the second electronic message in the manner that complies with the compliance criteria associated with the first classification type, the enforcing based on the machine learning policy indicating that the first classification type applies to the second electronic message.

2. The method of claim 1, wherein the express indication comprises a flag configured by the sender or a keyword that the classification scanner associates with enabling the first classification type.

3. The method of claim 1, wherein the receiving of the second electronic message by the enforcer is based on determining, by the classification scanner, that the second electronic message lacks the express indication.

4. The method of claim 1, further comprising:
   determining that at least a threshold number of electronic messages have been provided to the machine learning trainer; and
   enabling the machine learning policy based on the threshold number of electronic messages having been provided to the machine learning trainer.

5. The method of claim 1, wherein the first classification type indicates whether at least one of the following applies to the first electronic message: encryption, quarantine, archive, or brand.

6. The method of claim 1, wherein the first classification type indicates that best mode of delivery encryption applies to the first electronic message.

7. The method of claim 1, wherein the machine learning policy corresponds to one of a plurality of machine learning policies determined by the machine learning trainer, and wherein the method further comprises indicating to the machine learning trainer which of the machine learning policies to update based on the first electronic message.

8. The method of claim 1, further comprising:
in response to determining that different senders have one or more characteristics in common, indicating to the machine learning trainer to update the same machine learning policy based on electronic messages received from the different senders.

9. One or more non-transitory computer-readable media comprising logic that, when executed by processing circuitry, causes the processing circuitry to:
receive, by a classification scanner, a first electronic message, the first electronic message outbound from a sender to a recipient;
determine, by the classification scanner, a first classification type that applies to the first electronic message, the first classification type determined based on an express indication configured by the sender prior to sending the first electronic message to the recipient, the express indication indicating that the sender has requested that the first electronic message be handled in a manner that complies with a compliance criteria, wherein determining the first classification type comprises scanning the first electronic message by a plurality of scanners associated with the classification scanner, each scanner configured to scan the first electronic message for a respective classification type of a plurality of classification types;
provide, by the classification scanner to a machine learning trainer, the first electronic message and an indication of the first classification type that applies to the first electronic message, the machine learning trainer adapted to determine a machine learning policy that associates attributes of the first electronic message with the first classification type;
receive, by an enforcer, a second electronic message, the second electronic message comprising one or more of the attributes that the machine learning policy associates with the first classification type; and
enforce, by the enforcer, handling the second electronic message in the manner that complies with the compliance criteria associated with the first classification type, the enforcing based on the machine learning policy indicating that the first classification type applies to the second electronic message.

10. The non-transitory computer-readable media of claim 9, wherein the express indication comprises at least one of: a flag configured by the sender or a keyword that the classification scanner associates with enabling the first classification type.

11. The non-transitory computer-readable media of claim 9, wherein the first classification type indicates whether at least one of the following applies to the first electronic message: encryption, quarantine, archive, or brand.

12. The non-transitory computer-readable media of claim 9, wherein the machine learning policy corresponds to one of a plurality of machine learning policies determined by the machine learning trainer, and wherein the logic is further configured to indicate to the machine learning trainer which of the machine learning policies to update based on the first electronic message.

13. The non-transitory computer-readable media of claim 9, further configured to indicate to the machine learning trainer to train the same machine learning policy based on electronic messages received from different senders in response to determining that the different senders have one or more characteristics in common.

14. An apparatus, comprising:
one or more interfaces; and
processing circuitry operable to:
receive, by a classification scanner, a first electronic message via the one or more interfaces, the first electronic message outbound from a sender to a recipient;
determine, by the classification scanner, a first classification type that applies to the first electronic message, the first classification type determined based on an express indication configured by the sender prior to sending the first electronic message to the recipient, the express indication indicating that the sender has requested that the first electronic message be handled in a manner that complies with a compliance criteria, wherein determining the first classification type comprises scanning the first electronic message by a plurality of scanners associated with the classification scanner, each scanner configured to scan the first electronic message for a respective classification type of a plurality of classification types;
provide, by the classification scanner to a machine learning trainer via the one or more interfaces, the first electronic message and an identification of the first classification type that applies to the first electronic message, the machine learning trainer adapted to determine a machine learning policy that associates attributes of the first electronic message with the first classification type;
receive, by an enforcer, a second electronic message, the second electronic message comprising one or more of the attributes that the machine learning policy associates with the first classification type; and
enforcing, by the enforcer, handling the second electronic message in the manner that complies with the compliance criteria associated with the first classification type, the enforcing based on the machine learning policy indicating that the first classification type applies to the second electronic message.

15. The apparatus of claim 14, wherein the express indication comprises at least one of: a flag configured by the sender or a keyword that the classification scanner associates with enabling the first classification type.

16. The apparatus of claim 14, the processing circuitry further operable to:
determine that at least a threshold number of electronic messages have been provided to the machine learning trainer; and
enable the machine learning policy based on the threshold number of electronic messages having been provided to the machine learning trainer.

17. The apparatus of claim 14, wherein the first classification type indicates whether at least one of the following applies to the electronic message: encryption, quarantine, archive, or brand.

18. The apparatus of claim 14, wherein the machine learning policy corresponds to one of a plurality of machine learning policies determined by the machine learning trainer, and wherein the processing circuitry is further operable to indicate to the machine learning trainer which of the machine learning policies to update based on the first electronic message.

19. The apparatus of claim 14, the processing circuitry further operable to:
in response to determining that different senders have one or more characteristics in common, indicate to the machine learning trainer to update the same machine learning policy based on electronic messages received from the different senders.

\* \* \* \* \*